March 14, 1967  S. A. ALFREDÉEN  3,308,925
FEED MEANS FOR MAGNETIC CONVEYOR
Filed Dec. 8, 1965  2 Sheets-Sheet 1

INVENTOR.
Sten Alfred Alfredéen
BY
Carness, Dickey & Pierce
ATTORNEYS.

March 14, 1967 S. A. ALFREDÉEN 3,308,925
FEED MEANS FOR MAGNETIC CONVEYOR
Filed Dec. 8, 1965 2 Sheets-Sheet 2

INVENTOR.
Sten Alfred Alfredéen
BY
Harness, Dickey & Pierce
ATTORNEYS.

United States Patent Office 3,308,925
Patented Mar. 14, 1967

3,308,925
FEED MEANS FOR MAGNETIC CONVEYOR
Sten Alfred Alfredéen, Farsta, Sweden, assignor to Diamond Power Specialty Corporation, Lancaster, Ohio
Filed Dec. 8, 1965, Ser. No. 512,375
Claims priority, application Sweden, Sept. 21, 1965, 12,255/65
11 Claims. (Cl. 198—41)

The present invention concerns magnetic conveyors for cast iron pellets or similar conveyor goods wherein the conveyor comprises an endless transport means, such as a chain including magnetic material, passing in a vertical or sloping path over rollers and passing along part of its length through a main magnetic field. In operating such conveyors it is difficult to supply or feed in the goods to the transport means so that this means catches the goods without allowing part of the goods to fall and not be transported. It has been found unsatisfactory to feed the transport goods directly in the main magnetic field to a part of the conveyor passing therethrough since neutral zones occur in the magnetic field wherein the transport goods can not be retained but fall down.

Such difficulties are avoided according to the present invention mainly by a barrier magnetic field which facilitates the catching of the transport goods by the transport means and prevents their falling down. This barrier magnetic field is arranged at a position for feeding the transport goods to the transport means and has a different direction than that of the main magnetic field, and magnetic elements are arranged at the feed position to produce secondary magnetic poles at the places where the risk for dropping the transport goods is greatest. Normally a fully effective barrier can be achieved if the barrier magnetic field is directed at right angles to the main magnetic field.

The feed position may be formed by an opening to a channel which may be the mouth of a non-magnetic tube through which the transport means passes, and the magnetic poles forming the barrier field are arranged on opposite sides of this channel. Thus, the barrier field extends across the path along which the transport means moves so that the entire cross section of the transport means is subject to the barrier magnetic field. The effect of this magnetic field extends over the entire cross section of the channel and is strengthened by secondary magnetic poles which are formed in the parts made of magnetic material.

A particular advantage of the suggested feeding arrangement is that it also serves as a cleaning device and separator for removing non-magnetic material from the magnetic transport goods. If the goods are contaminated with non-magnetic material, this material may be easily separated and allowed to fall down through the channel which may be open at its bottom. This cleaning and separating effect is particularly important when the transport goods are used as cleaning elements in soot removing arrangements for economizers, boilers and the like wherein the cleaning elements are usually cast iron pellets which become covered with soot and other contaminants when passing through the heating unit. It has also been found that the extremely troublesome contaminants encountered when cleaning the heating surfaces in a black-liquor recovery plant can be efficiently removed by feeding the cleaning elements into a transport means according to the present invention.

One embodiment of the invention is illustrated in the accompanying drawings in which.

Figure 1:
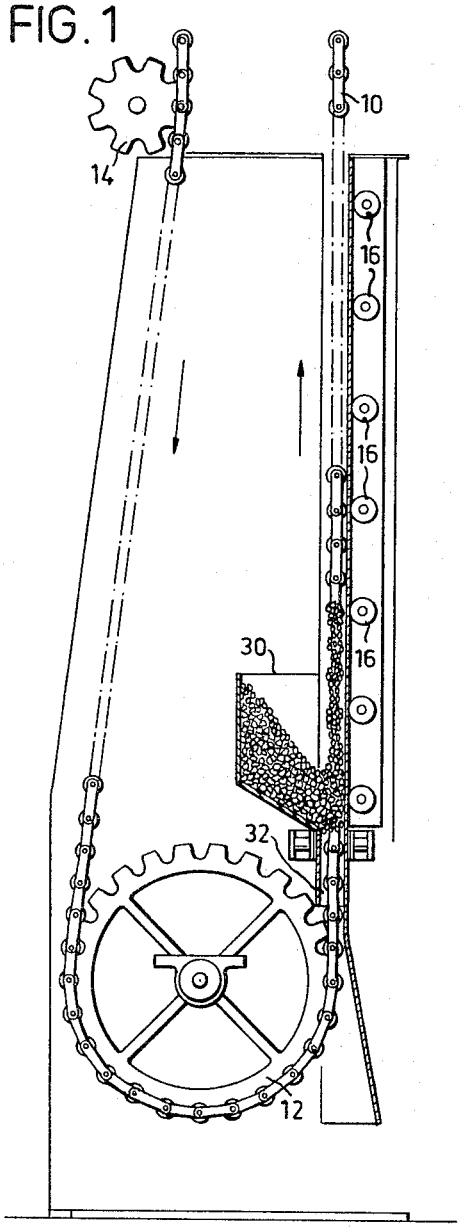
FIG. 1 shows a vertical projection partly in section of a lower part of a magnetic conveyor with a feed-in arrangement according to the invention.
Figure 4:
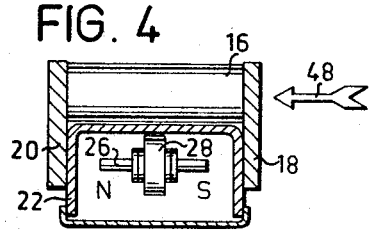
FIG. 4 shows a horizontal section taken along line 4—4 in FIG. 3.
Figure 5:
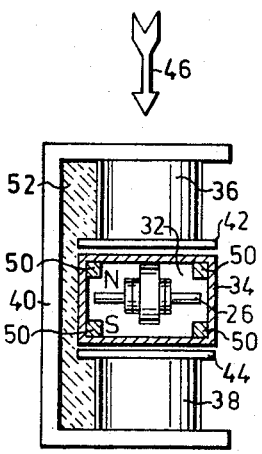
FIG. 5 shows a horizontal section along line 5—5 in FIG. 3.
Figure 2:
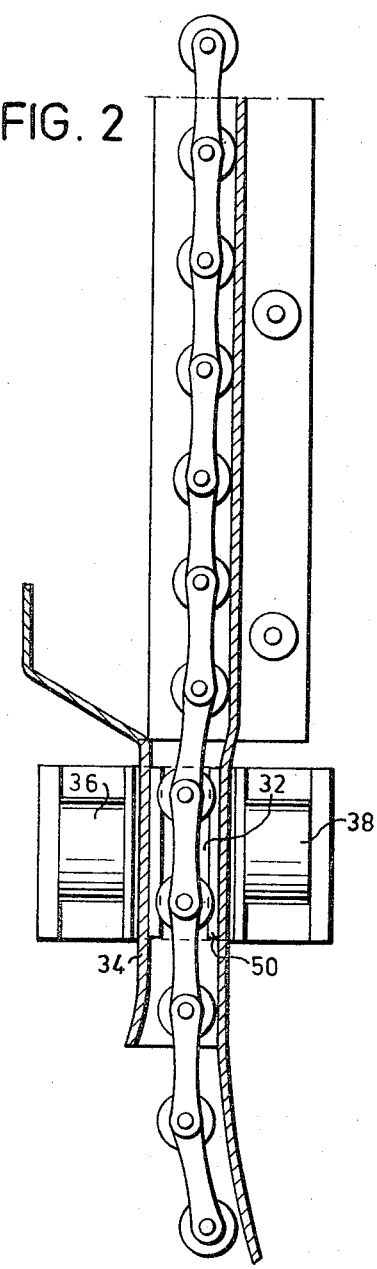
FIGS. 2 and 3 show two larger scale vertical projections of a part of the conveyor taken at right angles to each other and partly in section wherein the barrier magnet arrangement can be seen.
Figure 3:
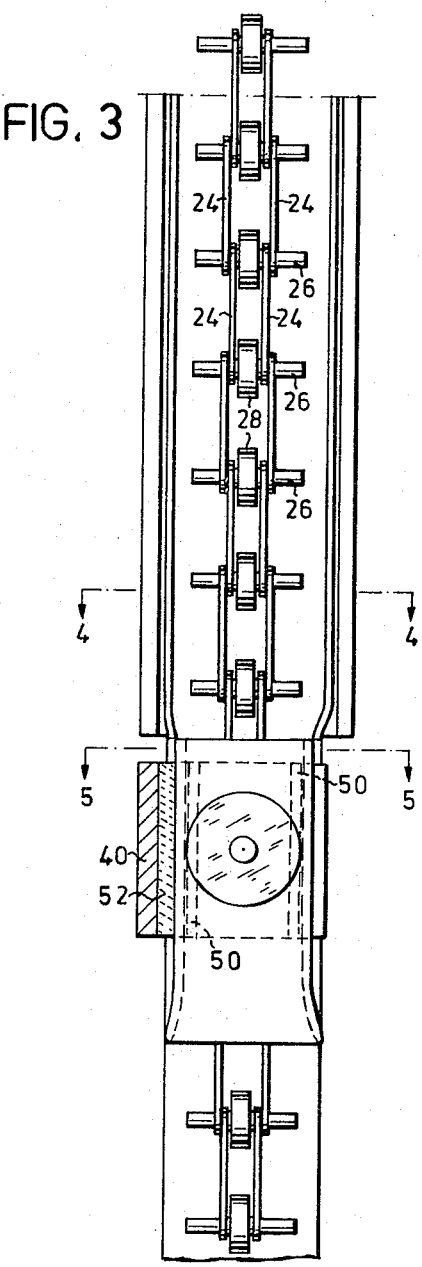

The transport means in the illustrated embodiment comprises a chain 10 which is endless and runs over a lower sprocket wheel 12 and an upper wheel not shown. The chain is held suitably taut by tension wheel 14. The parts of the transport chain may run vertically or at an angle. In the illustrated embodiment one portion of the chain runs vertically through a main magnetic field which is produced by a number of permanent magnets 16 which are coupled by means of rails 18, 20 which form pole pieces, the one 18 a north pole on one side of the transport chain and the other 20 a south pole on the opposite side of the chain. The transport chain runs in a guide rail 22 which has a U-shaped cross section and is made of non-magnetic material. The bottom of the U is turned against the magnets 16 and the two flanges are located between pole pieces 18 and 20.

In the illustrated embodiment the transport chain is formed of a series of links 24 joined by means of shafts 26 which like the links are made of magnetic material. The shafts are extended to the sides and are designed to form secondary magnetic poles in the main magnetic field and thus attract and carry along the transport goods. In order to facilitate the guiding of the chain in the U-shaped rails 22, rollers 28 are mounted on shafts 26 and these rollers roll against the bottom of rail 22 when the chain moves.

For supplying the transport goods to the chain there is a hopper 30 arranged between the parts of the chain. This hopper has an outlet located so that it empties into a channel 32 through which the transport chain passes in an upward direction. This channel is formed from a rectangular tube 34 of non-magnetic material. The hopper discharges into the upper end of this tube. In order to prevent the transport goods from falling out through the bottom outlet and thus not being picked up by the chain, a barrier magnetic field is arranged below the discharge point of the hopper. This barrier field is produced by a pair of permanent magnets 36, 38 which are magnetically coupled by means of a U-shaped yoke 40. Magnets 36 and 38 are arranged on opposite sides of tube 34 and furnished with pole pieces 42 and 44, respectively, on their ends facing the tube. These pole pieces spread the magnetic field so that it completely covers the cross section of channel 32. Pole plate 42 for example may form a north pole and plate 44 a south pole, in the barrier field which extends between magnets 36 and 38. The direction of this magnetic field which is indicated by arrow 46 is at right angles to the direction of the main magnetic field (indicated by arrow 48) which extends between pole rails 18 and 20.

The operation of the illustrated embodiment will now be described. Secondary poles, N and S, are produced in the ends of shafts 26 in the main magnetic field and also in the links 24 and when the chain moves upward the magnetic transport goods are attracted by the shafts and links and carried upward. However, there occur between the links zones which are magnetically neutral or so weak that the transport goods which enter these zones are not carried along but fall down from the outlet of hopper 30. These goods, however, are trapped in the barrier magnetic field which is formed in channel 34 between magnets 36 and 38. This field is perpendicular to shafts 26. Soft iron pieces 50 are arranged in the corners of the rectangular channel. Steel pieces may also be used. The soft iron pieces or rods 50 form secondary poles in the magnetic field which is produced by the magnets 36, 38 located on opposite sides of the channel, for example a north pole at N and a south pole at S. These rods reduce the distances to the transport means magnetic material, particularly to shafts 26, so that the magnet field around the transport means is strengthened. In this way all the transport goods are effectively carried along by the transport means.

As a further precautionary measure, particularly to avoid having cast-iron pellets or similar transport goods attach themselves to the outside of tube 34 inside yoke 40, the space between the magnets and the yoke is filled with non-magnetic material 52.

If the transport goods are contaminated by non-magnetic material (for example cast iron pellets covered with soot), this material is efficiently separated off by the arrangement. As can be seen in FIG. 1 the conveyor chain passes upward through the outlet of hopper 30 which is filled with pellets. Due to the friction against the chain and the walls of the surrounding channel, the various particles will roll and rub against each other and the surrounding surfaces so that the attached contaminants will be loosened. Then they can easily fall down through channel 32 which is open at its lower end. The contaminants can then be collected. The transport goods, on the other hand, are carried by the conveyor chain up through the main magnetic field to be delivered at a place where the chain leaves the main magnetic field and is no longer able to hold the transport goods.

The invention is not limited to the illustrated embodiment and may for example be applied also to a transport means of a different form than the illustrated chain. It may then be necessary to modify the extent and direction of the barrier magnetic field. It is therefore to be understood that within the scope of the appended claims the invention may be practiced otherwise than as specifically described.

What I claim is:

1. A magnetic conveyor comprising an endless transport means traveling along a predetermined path, means to produce a main magnetic field through which said endless transport means passes, a feed position for feeding magnet transport goods to said transport means, and means to produce a barrier magnetic field disposed across said path, and through which field said transport means passes before it passes through said main magnetic field; said barrier magnetic field being located adjacent and below said feed position.

2. A magnetic conveyor according to claim 1 wherein the feed position comprises the opening of a rectangular channel through which said transport means passes and said rectangular channel is formed by a tube of non-magnetic material.

3. A magnetic conveyor according to claim 2 wherein the means to produce a barrier magnetic field comprises magnetic poles on opposite sides of said rectangular channel.

4. A magnetic conveyor according to claim 3 wherein magnetic elements are fixedly located in the corners of said rectangular channel.

5. A magnetic conveyor according to claim 3 wherein a yoke holds said magnetic poles on opposite sides of said rectangular channel.

6. A magnetic conveyor according to claim 5 wherein the space between the yoke and the magnetic poles is filled with non-magnetic material.

7. A magnetic conveyor according to claim 2 wherein said channel is open downward so that non-magnetic material separated from said transport goods may drop out.

8. A magnetic conveyor according to claim 1 wherein the barrier magnetic field extends in a direction different from that of the main magnetic field.

9. A magnetic conveyor according to claim 1 extending at an angle to the horizontal and wherein the barrier field and main field extend at angles to each other and to the conveyor.

10. A magnetic conveyor according to claim 1 comprising a pair of parallel elongated magnetizable traction elements, the main magnetic field extending transversely of said traction elements and substantially parallel to a plane common to said elements, and the barrier field extending transversely with respect to said plane and with respect to said elements.

11. A magnetic conveyor comprising an endless transport means, means to produce a main magnetic field through which said endless transport means passes, a feed position for feeding magnet transport goods to said transport means, and means to produce a barrier magnetic field through which said transport means passes before it passes through said main magnetic field, said barrier magnetic field having a direction different from that of the main magnetic field and being located adjacent and below said feed position.

References Cited by the Examiner

UNITED STATES PATENTS 3,165,196  1/1965  Alfredeen _____ 198—41

FOREIGN PATENTS 517,883  2/1931  Germany.

EVON C. BLUNK, *Primary Examiner.*

RICHARD E. AEGERTER, *Examiner.*